United States Patent [19]

Gaudel et al.

[11] Patent Number: 4,936,056
[45] Date of Patent: Jun. 26, 1990

[54] OPHTHALMIC LENS CENTERING AND MOUNTING DEVICE

[75] Inventors: Jean-Claude Gaudel, Champigny-sur-Marne; Tony Michel, Crepy-en-Valois, both of France

[73] Assignee: Essilor International Cie Generale d'Optique, Creteil, France

[21] Appl. No.: 291,773

[22] Filed: Dec. 29, 1988

[30] Foreign Application Priority Data

Dec. 29, 1987 [FR] France .................................. 87 18286

[51] Int. Cl.⁵ .............................................. B24B 41/06
[52] U.S. Cl. .................................. 51/216 LP; 269/126; 51/217 R; 51/277
[58] Field of Search ................ 51/216 LP, 217 R, 277; 269/126, 289 R

[56] References Cited

U.S. PATENT DOCUMENTS

| | | | |
|---|---|---|---|
| 2,734,322 | 2/1956 | Vaughan | 51/277 |
| 3,417,454 | 12/1968 | Beasley | 51/216 LP |
| 3,586,448 | 6/1971 | Beasse | 356/172 |
| 4,665,624 | 5/1987 | Wodis | 51/216 LP |

FOREIGN PATENT DOCUMENTS

| | | |
|---|---|---|
| 2713168 | 9/1978 | Fed. Rep. of Germany ... 51/216 LP |
| 1484799 | 6/1967 | France . |
| 1548515 | 12/1968 | France . |
| 2188182 | 1/1974 | France . |

*Primary Examiner*—Judy Hartman
*Attorney, Agent, or Firm*—Charles E. Brown; Charles A. Brown

[57] ABSTRACT

An ophthalmic lens centering and mounting device includes a base which receives and centers the ophthalmic lens. A support receives a holding and securing device for the lens in a removable way and is carried by an arm mounted to swing on the base to apply the holding and securing device to the ophthalmic lens. A barrel mounted to rotate on the arm carries the support. A template support carried by the barrel receives in a removable way a template that has to be superposed on the lens before the holding and securing device is placed on the lens.

11 Claims, 2 Drawing Sheets

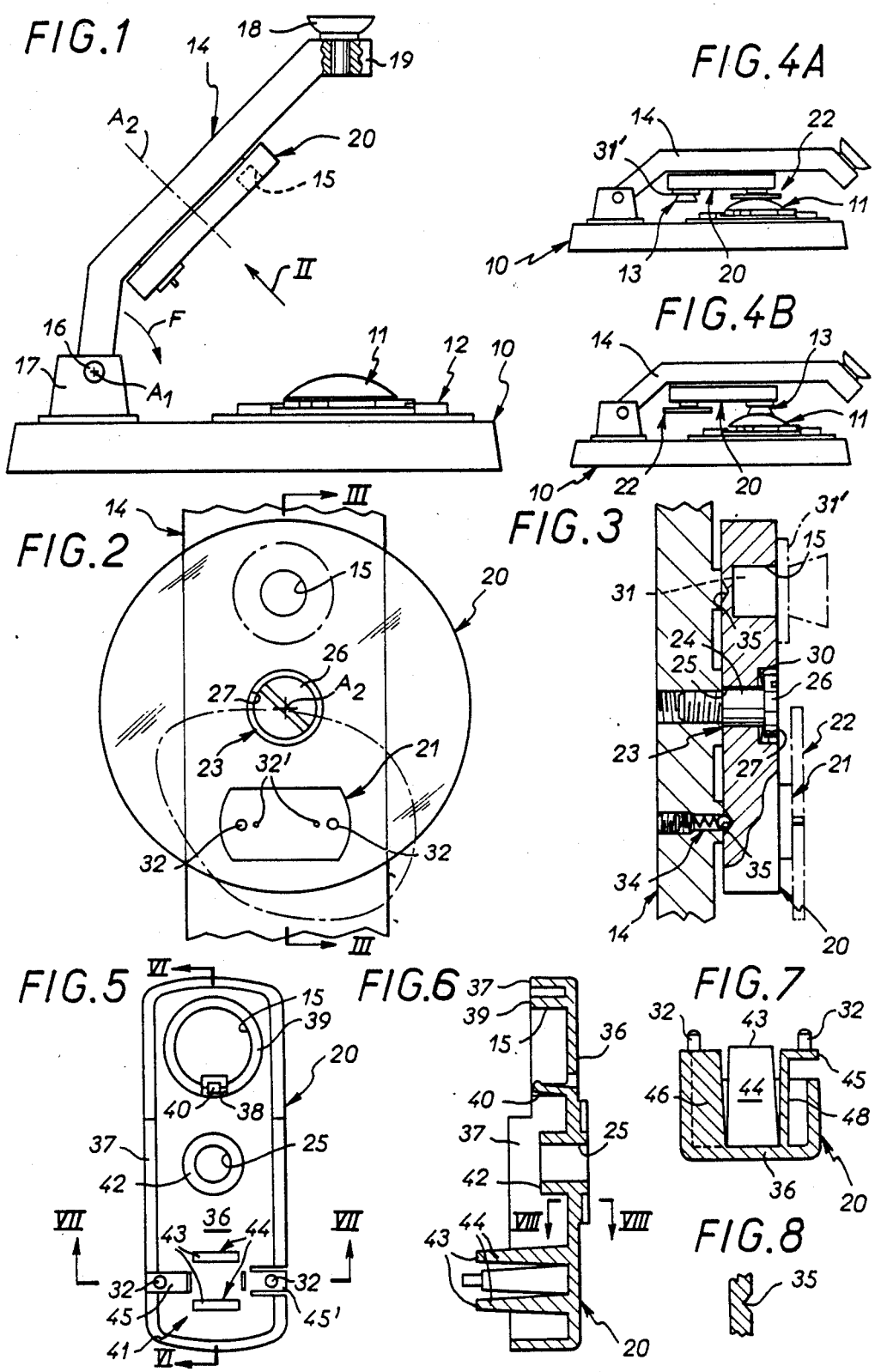

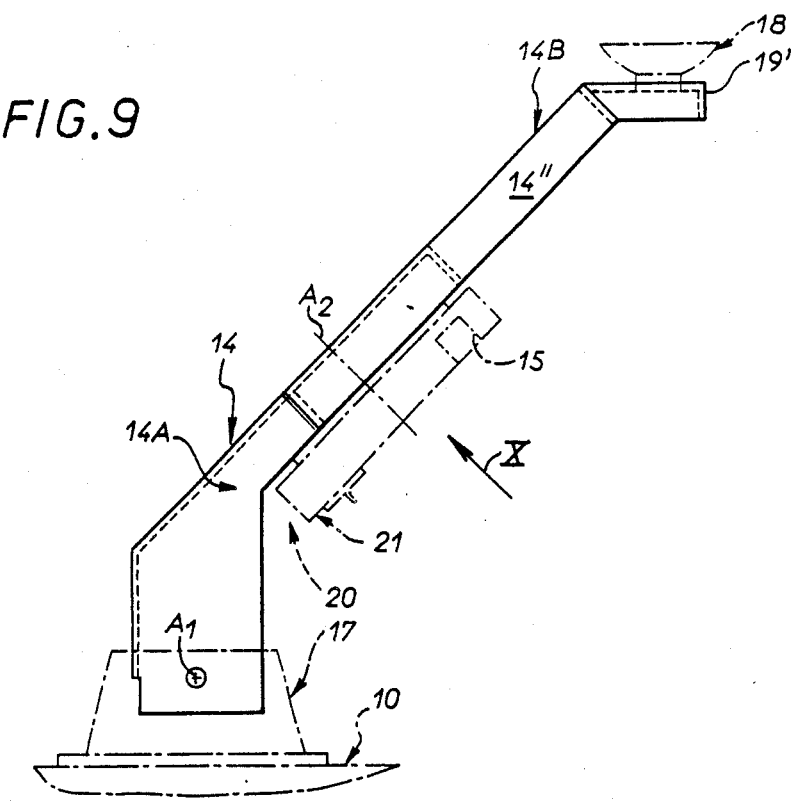
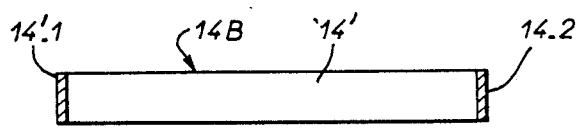
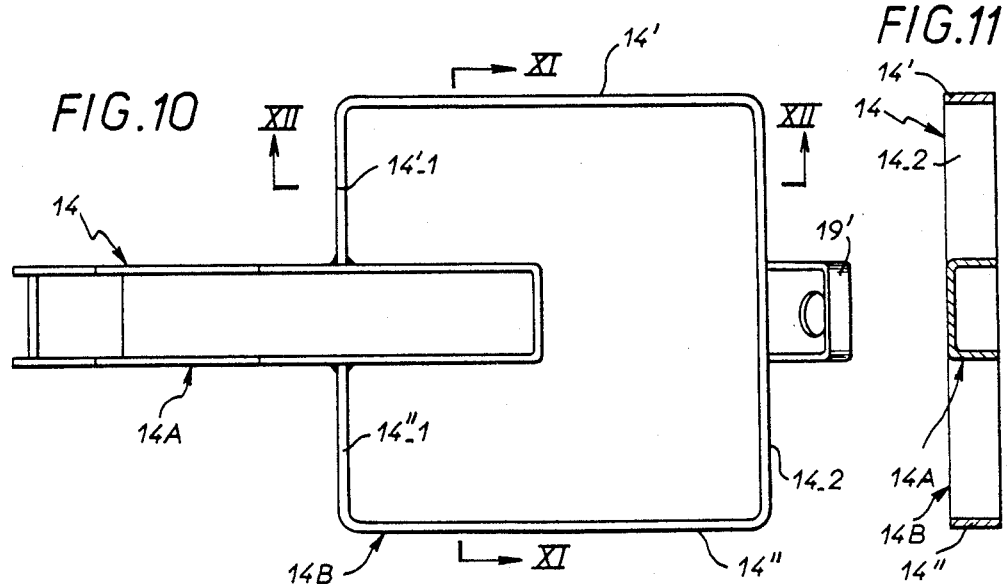

OPHTHALMIC LENS CENTERING AND MOUNTING DEVICE

BACKGROUND OF THE INVENTION

1. Field of the invention

The present invention is generally concerned with operations to be performed on an ophthalmic lens before it is mounted on a bevel routing machine for shaping its contour to suit the ring or surround of the eyeglass frame to be fitted with the lens.

2. Description of the prior art

The first operation required is that of centering the ophthalmic lens relative to fixed markers and according to parameters taking into account the physiological characteristics of the person concerned.

The next operation is mounting on the ophthalmic lens centered in this way a holding and securing device, for example a simple suction cup or a plastic gland, used to fit it to and secure it on the bevel routing machine used.

These operations can be performed manually.

In practice, however, they are usually performed by means of a centering or mounting device designed for this purpose.

Generally speaking, these centering and mounting devices all comprise a base adapted to receive the opthalmic lens to be processed and to center it.

In somewhat rudimentary implementations which have the advantage of being economical, as is the case for example with those which are the subject matter of French Pat. Nos. 1 484 799 and 1 548 515, the ophthalmic lens to be processed is in practice placed directly onto the suction cup which is to be attached to it and the corresponding attachment is secured by pushing the ophthalmic lens down relative to the suction cup after it has been appropriately centered relative to the latter.

In American Pat. No 2 734 322 the lens is pushed down by means of an arm mounted to swing on a base.

Centering and mounting devices of this kind are not able to ensure that, before mounting takes place, the ophthalmic lens fits inside the contour of the ring or surround of the eyeglass frame to which it is to be fitted, given the centering that has been applied to it.

The same applies in more complex implementations, and this is the case with that which is the subject matter of French Pat. No. 2 188 182, for example, in which, before mounting takes place, the ophthalmic lens is compared with a template representing the ring or surround of the eyeglass frame to which the lens is to be fitted and in which the suction cup or, more generally, any other form of holding and securing means is placed on the ophthalmic lens with the aid of an arm mounted to swing on the base of the device and fitted to this end with a support adapted to receive a holding and securing device of this kind in a removable way.

However, these complex implementations are considerably more costly than those previously described because in practice they use illumination means and optical means such as semi-reflecting mirrors to superpose an image of the contour of the ophthalmic lens on that of the template to be followed.

A general object of the present invention is an arrangement for ensuring in a simple and economical way that the ophthalmic lens fits within the contour of any template.

SUMMARY OF THE INVENTION

The present invention consists in an ophthalmic lens centering and mounting device comprising a base adapted to receive and center an ophthalmic lens, a holding and securing device for said ophthalmic lens, a support adapted to receive said holding and securing device in a removable way, an arm carrying said support mounted to swing on said base to apply said holding and securing device to said ophthalmic lens, a barrel mounted to rotate on said arm and carrying said support and a template support carried by said barrel and adapted to receive in a removable way a template to be superposed on said ophthalmic lens before said holding and securing device is placed on said ophthalmic lens.

The barrel may be a transparent disk, for example, or a simple bar member. In practice it is able to occupy on the arm one or other of at least two positions, for one of which the template is applied when the arm is swung and for the other of which it is the holding and securing device that is applied.

In the first position the template is directly superposed on the previously centered ophthalmic lens and it suffices to check visually that the lens fits within its contour.

In the second position, and assuming that the result of the previous check was satisfactory, the holding and securing device is applied to the ophthalmic lens and attached to it.

The characteristics and advantages of the invention will emerge from the following description given by way of example only with reference to the appended schematic drawings.

BRIEF DESCRIPTION OF THE DRAWINGS

FIG. 1 is a locally, cut away view in elevation of a centering and mounting device in accordance with the invention.

FIG. 2 is a partial view to a larger scale of the barrel and the swinging arm that this centering and mounting device comprises, as seen from below in the direction of the arrow II in FIG. 1.

FIG. 3 is a view of the barrel and the swinging arm in axial cross-section on the line III-III in FIG. 2.

FIGS. 4A and 4B are elevation views to a reduced scale similar to that of FIG. 1 and showing two successive phases in use of the centering and mounting device in accordance with the invention.

FIG. 5 is, in a similar way to FIG. 2, a view from below of an alternative embodiment of the barrel that the centering and mounting device in accordance with the invention comprises.

FIGS. 6 and 7 are views of this barrel in cross-section on the lines VI-VI and VII-VII respectively in FIG. 5.

FIG. 8 is a partial view of it in cross-section on the line VIII-VIII in FIG. 6.

FIG. 9 is a view in elevation similar to that of FIG. 1 but to a larger scale of an alternative embodiment of the swinging arm that the centering and mounting device in accordance with the invention comprises.

FIG. 10 is a view of it from below in the direction of the arrow X in FIG. 9.

FIGS. 11 and 12 are views of it in cross-section on the lines XI-XI and XII-XII respectively in FIG. 10.

DESCRIPTION OF THE PREFERRED EMBODIMENTS

As shown in the figures the centering and mounting device in accordance with the invention comprises a base 10 adapted to receive and center an ophthalmic lens 11.

To this end the base 10 is fitted above a grid array of markers not visible in the figures with an XY12-type table on which the lens 11 is to be placed and which enables the lens to be moved along either or both the two orthogonal directions of the grid array of markers.

As these arrangements are well known in themselves and do not of themselves form any part of the present invention they will not be described in further detail here.

The centering and mounting device in accordance with the invention further comprises an arm 14 mounted to swing on the base 10 to place a holding a securing member 13 on a ophthalmic lens 11. The arm 14 is equipped with a support 15 adapted to receive in a removable way the holding and securing device 13 to be applied.

The arm 14 is fitted with journals 16 by means of which it is articulated to a yoke 17 carried by the base 10.

A1 is the axis about which the arm 14 swings relative to the base 10, schematically represented by a cross in FIG. 1.

It is parallel to the base 10.

As the yoke 17 is offset from the table 12, the arm 14 (which is cranked for this purpose) extends in the manner of a boom over the table 12 and carries at its end, over the table, an eyepiece 18 for eliminating any parallax when observing the lens 11 placed on the table 12.

In its deployed standby configuration as shown by FIG. 1 the end 19 of the arm 14 carrying the eyepiece 18 is substantially horizontal, parallel to the base 10.

Abutment or snap-fastener means may naturally be provided to define in a positive way this deployed standby position of the arm 14 and spring means may also be provided for urging it towards this position at all times.

These arrangements are within the ordinary competence of those skilled in the art and as they do not of themselves form any part of the present invention they will not be described here.

The support 15 provided on the arm 14 for the holding and securing member 13, referred to hereinafter for convenience only as the suction cup support, is carried by a barrel 20 mounted to rotate on the arm 14 and which also carries another support called the template support 21 adapted to receive in a removable way a template 22 to be superposed on the ophthalmic lens 11 before the holding and securing member 13 is applied to the lens.

In the embodiment shown in FIGS. 1 through 3 the barrel 20 is in the form of a transparent disk which is mounted on the lower surface of the arm 14 and projects laterally relative to the arm 14 to a considerable degree.

It is attached to the arm by a screw 23 the shank of which passes with slight friction by virtue of a smooth section 24 through a hole 25 provided for this purpose in its central part and the head 26 of which is accommodated in a recess 27 provided for this purpose in its surface.

An axially acting spring washer 30, a simple Belleville washer, for example is placed between the bottom of the recess 27 and the head 26 of the screw 23 so that the disk constituting the barrel 20 is applied without clearance against the arm 14 which carries it.

A2 is the axis about which the barrel 20 rotates on the arm 14.

The axis A2 is schematically represented in chain-dotted line in FIG. 1 and by a cross in FIG. 2.

The axis A2 is in a plane perpendicular to the base 10.

It is therefore orthogonal to the swinging axis A1 of the arm 14.

The holding and securing member 13 is a suction cup.

As is well known, a suction cup of this kind is attached to a generally cylindrical end-piece 31 enabling it to be handled and fixed to the bevel routing machine, with a flange 31' between the end-piece 31 and the suction cup.

The suction cup support 15 with which the barrel 20 is fitted is simply a recess adapted to receive the end-piece 31.

The end-piece 31 may be inserted in this recess with slight friction.

As will emerge subsequently, however, snap-fastener means may be associated with this recess to retain in a removable way the end-piece 31 inserted into it.

Mechanical clamping means may also be associated with it to provide a stronger fixing if required, in the form of a grubscrew, for example.

In the embodiment shown in FIGS. 1 through 3 the template support 21 is in the form of a plate projecting from the surface of the barrel 20 and itself carries at least one pair of spaced parallel projecting pegs 32 for receiving the template 22.

In the embodiment shown two pairs of pegs 32, 32' are provided to enable the use of two different kinds of template 22.

As will emerge hereinafter, in each pair of pegs 32, 32' at least one of the pegs is elastically deformable or comprises an elastically deformable mounting so that the corresponding template 22 can be force-fitted and therefore retained securely.

The suction cup support 15 and the template support 21 are disposed in diametrically opposed positions relative to each other on the barrel 20 which carries them.

In the embodiment shown in FIGS. 1 through 3 the barrel 20 is solid apart from the recess constituting the suction cup support 15.

Indexing means 34 are optionally provided between the barrel 20 and the arm 14 which carries it.

In this embodiment these are ball-type indexing means carried by the arm 14 and the barrel 20 has two housings 35 recessed into its surface facing towards the arm 14, in corresponding relationship to the suction cup support 15 and the template support 21, for cooperating with the corresponding balls. The housings 35 are at opposite ends of a common diameter.

The barrel 20 can therefore be releasably halted in one or other of two distinct angular positions of rotation about its rotation axis A2, one corresponding to the suction cup support 15 and the other corresponding to the template support 21.

To process an ophthalmic lens 11 the first step, with the arm 14 in its deployed standby position, is to center the ophthalmic lens 11 using the table 12 through the eyepiece 18 and allowing for the parameters to be complied with such as the interpupillary distance of the person concerned and the mounting height in relation to distant vision.

A template 22 is then fitted to the template support 21 of the barrel 20 and, after any necessary rotation of the barrel 10 about its axis A2 into its position in which the template support 21 is nearest the eyepiece 18, the arm 14 is swung about its axis A1 as shown by the arrow F in FIG. 1.

As schematically shown in FIG. 4A the swinging of the arm 14 causes the template 22 carried by the barrel 20 to be superposed on the previously centered ophthalmic lens 11.

The operator then has only to check visually that the ophthalmic lens 11 fits entirely within the contour of the template 22, given the centering of the lens.

After raising the arm 14, a holding and securing member 13 is then fitted into the suction cup support 15 of the barrel 20. After rotating the barrel 20 through a half-turn into its position in which the suction cup support 15 is nearest the eyepiece 18 the arm 14 is swung over again.

As schematically represented in FIG. 4B the swinging over of the arm 14 causes the holding and securing member 13 to be applied (and in practice attached) to the lens 11.

In the alternative embodiment shown in FIGS. 5 through 8 the barrel 20 is in the form of a bar and therefore has a contour whereby in both its operative angular positions it lies within the contour of the arm 14 carrying it, without projecting laterally relative thereto, which is advantageous.

In this embodiment the barrel 20 is a hollow or cup-like bar.

It therefore comprises a back 36 and a peripheral rim 37.

The recess constituting the suction cup support 15 is delimited by a generally cylindrical wall 39 projecting from the back 36 at one end thereof and ending flush with a portion of the peripheral rim 37 which is set back relative to the main part thereof.

By means of a slit 38 in the generally cylindrical wall 39 an elastically deformable tang 40 in one piece with the back 36 is obtained. Its free end, provided with a bead, projects slightly into the recess 15 to constitute snap-fastener means adapted to retain there in a releasable way the holding and securing member 13.

In the central part of the back 36 the hole 25 is defined by a generally cylindrical wall 42 projecting from the back 36.

The template support 21 is subdivided to form four separate sectors.

Two sectors 43 are aligned with the length of the bar constituting the barrel 20, on its median line. Each is formed beyond the edge of the peripheral rim 37 of the bar by the respective free edge of one of two pillars 44 in one piece with the back 36 of the bar.

In a cruciform arrangement with these are two sectors 45, 45' each carring a respective peg 32.

Like the previously mentioned sectors 43, the sector 45 is formed by the free edge of a pillar 46 in one piece with the back 36 of the bar.

The sector 45', on the other hand, is formed by a right-angle lip projecting from the end of an elastically deformable tang 48 in one piece with the back 36, which provides an elastically deformable mounting for the corresponding peg 32.

The sectors 45, 45' are set back slightly relative to the sectors 43 so that only the latter support a template 22 fitted to the pegs 32.

The housings 35 provided on the surface of the barrel 20 facing towards the arm 14 carrying it are V-profile grooves aligned with a diameter of the corresponding hole 25 and extending along the length of the bar constituting the barrel 20.

The barrel is used in the same way as previously described.

In the embodiment shown in FIGS. 9 through 12 the arm 14 carrying the barrel 20 is divided over part at least of its length into two branches 14', 14".

The arm 14 comprises a main part 14A by which it is articulated to the base 10 as previously and a frame 14B of which the two branches 14', 14" form part and which carries the associated eyepiece 18 through the intermediary of a bracket 19' with a hole in it aligned with the main part 14A.

The main part 14A extends across the frame 14B, substantially to its center.

The main part 14A has a cupped shape.

The frame 14B has its flanks parallel to those of the cup-like member constituting the main part 14A and the frame is generally rectangular (square in practice) with the corners radiused.

In addition to the branches 14', 14" which extend longitudinally and parallel to the main part 14A the frame 14B comprises two crossmembers of which one is divided into two sections 14'-1, 14"-1 terminating at said main part 14A and the other 14-2 carries the bracket 19' at a distance from the end of the main part 14A.

The assembly may be fabricated from welded sheetmetal, for example, or molded from a synthetic material.

The arm 14 is fitted with a barrel 20 of either type as previously described, for example. A plate for pivotally mounting a barrel 20 of this kind may be attached to the main part 14A by welding, by means of an interference fit, or otherwise.

It will be readily understood that when a template is superposed on the ophthalmic lens to be processed the frame 14B offers the advantage of making visible between its branches 14', 14" at least that part of the template which projects beyond the main part 14A, so facilitating the display of a height relative to the corresponding base of the template.

It is to be understood that the present invention is not limited to the embodiments described and shown but encompasses any variant execution thereof and/or alternative combinations of their various component parts.

We claim:
1. An ophthalmic lens centering and mounting device comprising a base including means to receive and center an ophthalmic lens, an arm swingingly mounted on the base between on operative position wherein said arm is proximate said base and on inoperative position wherein said arm is remote from said base, a barrel rotatably mounted on said arm, said barrel carrying a template support on a first portion of the barrel for removably mounting a template to be superposed on the ophthalmic lens for centering the same, said barrel further carrying a support on a second portion of the barrel for removably mounting holding and securing means for holding and securing the ophthalmic lens, said barrel rotatably selectively positioning either said support or said template support in alignment to the lens, whereby said arm may be moved to said operative position to allow engagement of said holding and securing means or superposition of said template on said lens.

2. The device according to claim 1, wherein said first and second barrel portions are disposed on said barrel in diametrically opposed positions.

3. The device according to claim 1, wherein said arm is swingingly mounted on said base about a first axis orthogonal to a second axis about which the said barrel is rotatably mounted.

4. The device according to claim 1, further comprises indexing means between said arm and said barrel.

5. The device according to claim 1, wherein said barrel comprises a transparent disk.

6. The device according to claim 1, wherein said barrel comprises a bar.

7. The device according to claim 1, wherein said support comprises a recess.

8. The device according to claim 1, wherein said template support comprises at least one pair of projecting pegs at least one of which is elastically deformable.

9. The device according to claim 1, wherein said template support comprises elastically deformable mounting means.

10. The device according to claim 1, wherein over at least part of its length said arm comprises two branches.

11. The device according to claim 10, wherein said arm comprises a main part articulated to said base and carrying said barrel, said branches forming part of a frame, said frame carrying an eyepiece.

* * * * *